United States Patent [19]
Yamada et al.

[11] Patent Number: 5,170,255
[45] Date of Patent: Dec. 8, 1992

[54] OPTICAL SYSTEM COMPENSATING APPARATUS

[75] Inventors: Kunihiko Yamada, Tokyo; Shigeru Ogino, Kanagawa, both of Japan

[73] Assignee: Canon Kabushiki Kaisha, Tokyo, Japan

[21] Appl. No.: 794,598

[22] Filed: Nov. 15, 1991

Related U.S. Application Data

[63] Continuation of Ser. No. 654,396, Feb. 8, 1991, abandoned, which is a continuation of Ser. No. 422,025, Oct. 16, 1989, abandoned.

[30] Foreign Application Priority Data

Oct. 20, 1988 [JP] Japan .................. 63-262694

[51] Int. Cl.⁵ .......... H04N 5/228; G03B 7/08; G02B 27/64
[52] U.S. Cl. .................. 358/222; 354/430; 359/554
[58] Field of Search ............ 358/222, 225, 105, 209; 354/70, 65, 430; 328/127, 167; 359/554, 555, 557

[56] References Cited

U.S. PATENT DOCUMENTS

| | | | |
|---|---|---|---|
| 4,288,596 | 11/1988 | Kawakami et al. | 358/222 |
| 4,403,256 | 9/1983 | Green et al. | 358/222 |
| 4,410,914 | 10/1983 | Siau | 358/222 |
| 4,476,494 | 10/1984 | Tugayé | 358/222 |

*Primary Examiner*—James J. Groody
*Assistant Examiner*—Safet Metjahic
*Attorney, Agent, or Firm*—Robin, Blecker, Daley & Driscoll

[57] ABSTRACT

An optical system compensating apparatus comprising an image sensing element for converting an optical image formed by a photographic optical system into an electrical signal, a variation detecting circuit receptive of the image signal from the image sensing means for detecting a temporal variation of the image for each picture, and a drive system for driving the photographic optical system on the basis of the detection result of the variation detecting circuit so that the temporal variation of the image becomes smaller, thereby automatically compensating for the shake of the image, wherein a judgment circuit is provided for judging whether or not the temporal variation of the picture is a monotonous increase or a monotonous decrease in a certain direction from the detection result of the variation detecting circuit, so that the drive system is controlled in accordance with the judgment result.

28 Claims, 7 Drawing Sheets

OPTICAL SYSTEM COMPENSATING APPARATUS

This is a continuation application under 37 CFR 1.62 of prior application Ser. No. 654,396, filed Feb. 8, 1991 now abandoned which is a continuation application under 37 CFR 1.62 of prior application Ser. No. 422,025, filed Oct. 16, 1989.

BACKGROUND OF THE INVENTION

1. Field of the Invention

This invention relates to an optical system compensating apparatus for automatically compensating for the shake of a picture when shooting a video camera.

2. Description of the Related Art

Recently, usage of video cameras and like video instruments has, not been limited to broadcast purposes and professionals, but usage is spreading wide among the general public. For home usage, the portability and manageability are regarded as important. The prevailing trend to minimize the size of the camera increases the opportunities for holding the camera by hand when shooting. With a person unaccustomed to the camera, when doing hand-held shooting, camera shakes are apt to occur, so that, as the picture is not stabilized against them, it will jiggle on the monitor. Such a motion introduced by the camera shakes into the entirety of the picture detracts from the quality of the picture itself, giving an unpleasant impression to the viewer.

A shake compensating apparatus is disclosed in U.S. Pat. No. 4,788,596, U.S. patent application Ser. No. 880,152 filed on Jun. 30, 1986, U.S. patent application Ser. No. 319,658 filed on Mar. 6, 1989, and others.

It is also known to provide an apparatus having means for detecting motion of the object image irrespective of the shake detection as, for example, disclosed in U.S. Pat. No. 5,031,049 filed on May 23, 1985, U.S. Pat. No. 4,872,058 filed on Oct. 8, 1987, Ser. No. 237,511 filed on Aug. 26, 1988 and Ser. No. 240,915 filed on Sep. 6, 1988.

Now, concerning the apparatus for stabilizing the image against the shakes of the camera, the feature that constitutes the premise of the invention is first explained. There has been a previous proposal of such a compensating apparatus for optical system as shown in FIG. 1. The apparatus includes a variable angle prism 10 in the form of the so-called binary lens capable of varying the direction of its optical axis and a photographic optical system 12 comprised of various lenses. The photographic optical system 12 forms an image on the imaging plane of an image sensor 14, for example, a CCD, in which the optical information is photoelectrically converted to produce video signals. The video signal output from the image sensor 14 is converted to a formatted form, for example, NTSC, by a processing circuit 16. The apparatus further includes a shake detecting circuit 18 receptive of the output 16a of the processing circuit 16 for producing an output representing the amount of temporal variation of the picture between successive two fields or frames and the direction of that variation, an integration circuit 20 for integrating the output of the shake detecting circuit 18 to obtain the direction of compensation and the amount of compensation for the temporal variation of the picture, and a drive circuit 22 for driving the variable angle prism 10 based on the output of the integration circuit 20.

Of the parts of FIG. 1, the photographic optical system 12, the image sensor 14 and the processing circuit 16 are well known, since these constitute the general form of the video cameras their explanation is omitted. The shake detecting circuit 18 computes the position of a characteristic point of the picture, for example, an edge, or the center of gravity, during transferring of one field or one frame when the amount of shake and the direction of shake between the successive two fields or frames is determined from the video signal 16a output from the processing circuit 16. An example of the construction of the shake detecting circuit 18 is shown in FIG. 2.

Referring to FIG. 2, the video signal 16a output from the processing circuit 16 enters an edge distribution detecting circuit 24 for detecting the distribution of edges of an object in the photographed picture. For example, from the number of edges in the predetermined vertical or horizontal line, the characteristic of the object is detected. The detection information for one picture from the edge distribution detecting circuit 24 is stored in, and, after the delay of one field period, is output from a delay circuit 26. A comparison circuit 28 compares the edge distribution information of the edge distribution detecting circuit 24 with the output (one picture earlier edge distribution information) of the delay circuit 26 to produce an image shake detection signal 18a representing the amount of shake and the direction of shake of the picture. By such an arrangement, the shake detecting circuit 18 produces the shake detection information 18a indicative of a change in the image position between the pictures, that is, the shake of the image, and the motion of the object in each period of one field or one frame.

The integration circuit 20 accumulates the shake detection information 18a of the shake detecting circuit 18 over successive several fields or several frames. The details of the integration circuit 20 are shown in FIG. 3. The output of an adder 30 is rid of the information on a band of frequencies at which compensation is not aimed, in words, the other band of frequencies other than that of a component attributable to the shaking, by passing the output through a band-pass filter 32. The output of the band-pass filter 32 is stored in a memory 34 and, after one field period, is output therefrom to the adder 30. In other words, the memory 34 functions as a one-picture delay element. The adder 30 adds information of the shake between the present and the preceding pictures to the shake detection information 18a output from the shake detecting circuit 18. In more detail, the amount of shake and the direction of shake obtained one picture before are combined in vector with the amount of shake and the direction of shake obtained two pictures before. Since the frequencies of the shaking of the camera generally fall within a range of from 0.5 Hz to 10 Hz, the frequency components other than the necessary band are removed by the band-pass filter 32. The output of the band-pass filter 32 is delayed by the memory 34 before it is applied again to the adder 30. This procedure is repeated over several fields or frames. Thus, an integrated value 20a of the shake information over the several fields or frames can be obtained.

The output 20a of the integration circuit 20 is used for compensating for the shake. Thus, it is a signal representing the amount of compensation and the direction of compensation, that is, a shake compensation signal. Based on this shake compensation signal 20a, the drive circuit 22 drives the variable angle prism 10 to a corresponding direction by a corresponding distance to those in and by which its amount of deflection of the image decreases to a minimum. It should be noted that there are limits on the total movement of the variable angle prism 10. As a violent camera shake occurs, or flowing shots are taken, or the shooting direction is changed, causing the so-called panning or tilting, when the limit is reached, therefore, a reset signal 10 is produced, which is supplied to the integration circuit 20 (more specifically, the memory 34). At the same time, the variable angle prism 10 also is returned to the initial angular position.

By such an operation as described above, even in a case where the camera shake has occurred in hand-held photography, the motion of the image can be automatically compensated for.

However, if, in the above-described conventional example, the photographer performs panning or tilting for a relatively long time, the variable angle prism 10 is caused to change in one direction with respect to the panning or tilting direction until it strikes on the limit of its allowable range of movement. As it is reset, the prism 10 moves back to the initial position. Then the compensating movement is started again. The repetition of such a procedure gives an alternative problem of making the picture uncomfortable to view.

SUMMARY OF THE INVENTION

The present invention has been made to solve the above-described problem, and a first object is to provide a shake compensating apparatus for an optical system, which enables the shake compensation to be performed in an optimum manner depending on the photographic situation.

A second object of the invention is to provide a shake compensating apparatus which can control an optical system in a manner suited to the case where the temporal variation of the picture either monotonously increases or monotonously decreases in a certain direction for a long time as panning or tilting is occurring.

A third object of the invention is to provide a shake compensating apparatus for an optical system, which when the monotonous variation of the picture in one direction continues the apparatus stops or suppresses compensating for the shake, thus preventing the unnecessary compensation for the image shake from occurring.

To achieve such objects, according to the invention, in a preferred embodiment thereof, an optical system compensating apparatus is disclosed that is provided with image sensing means for converting an optical image formed by a photographic optical system into an electrical signal, variation detecting means receptive of an image signal output from the image sensing means for detecting a temporal variation of each picture, drive means responsive to the detection result of the variation detecting means for driving the photographic optical system so as to decrease the temporal variation of each picture, and judgment means for judging the degree of temporal variation of each picture from the detection result of the variation detecting means and controlling the drive means in accordance with the judgment result.

With this, because whether or not panning or tilting operates is sensed by the aforesaid judgment means, when in panning or tilting, the compensation of the photographic optical system is adjusted by controlling the adjustment of the drive signal of the drive means, or the drive means itself. Thereby it is made possible to carry out panning or tilting, while stopping or suppressing compensation of the optical system. Hence, the unnecessary compensation for the image shake can be avoided.

A fourth object of the invention is to provide a shake compensating apparatus which controls the shake compensating operation from the degree of variation of the image so that an optimum shake compensation according to the photographing state can be carried out.

Another or fifth embodiment of the invention is to prevent an unnatural operation of the compensating optical system for compensating for the shake.

To achieve such objects, according to the invention, in a preferred embodiment thereof, an image shake detecting device is disclosed that comprises detecting means for detecting the amount of temporal variation of an image and the direction of the variation, compensating means for compensating an optical system in a direction to cancel the variation of the image on the basis of the detection result of the detecting means, judgment means for judging the degree of variation of the image from an output of the detecting means, and control means for controlling a compensating operation of the compensating means on the basis of the judgment result of the judgment means.

By this, on detection of the fact that the temporal variation of the image monotonously increases or monotonously decreases in a certain direction, panning or tilting can be judged.

A sixth object of the invention is to provide an apparatus in which when panning or tilting is judged, the compensating operation of an optical system for compensating for the shake of the image is stopped or suppressed so that a natural, smooth compensation for the shake of the image is possible to perform.

Other objects and features of the invention will be apparent from the written specification and the drawings shown below.

DETAILED DESCRIPTION OF THE PREFERRED EMBODIMENTS

The present invention is next described in connection with embodiments thereof by reference to the drawings.

Figure 1:
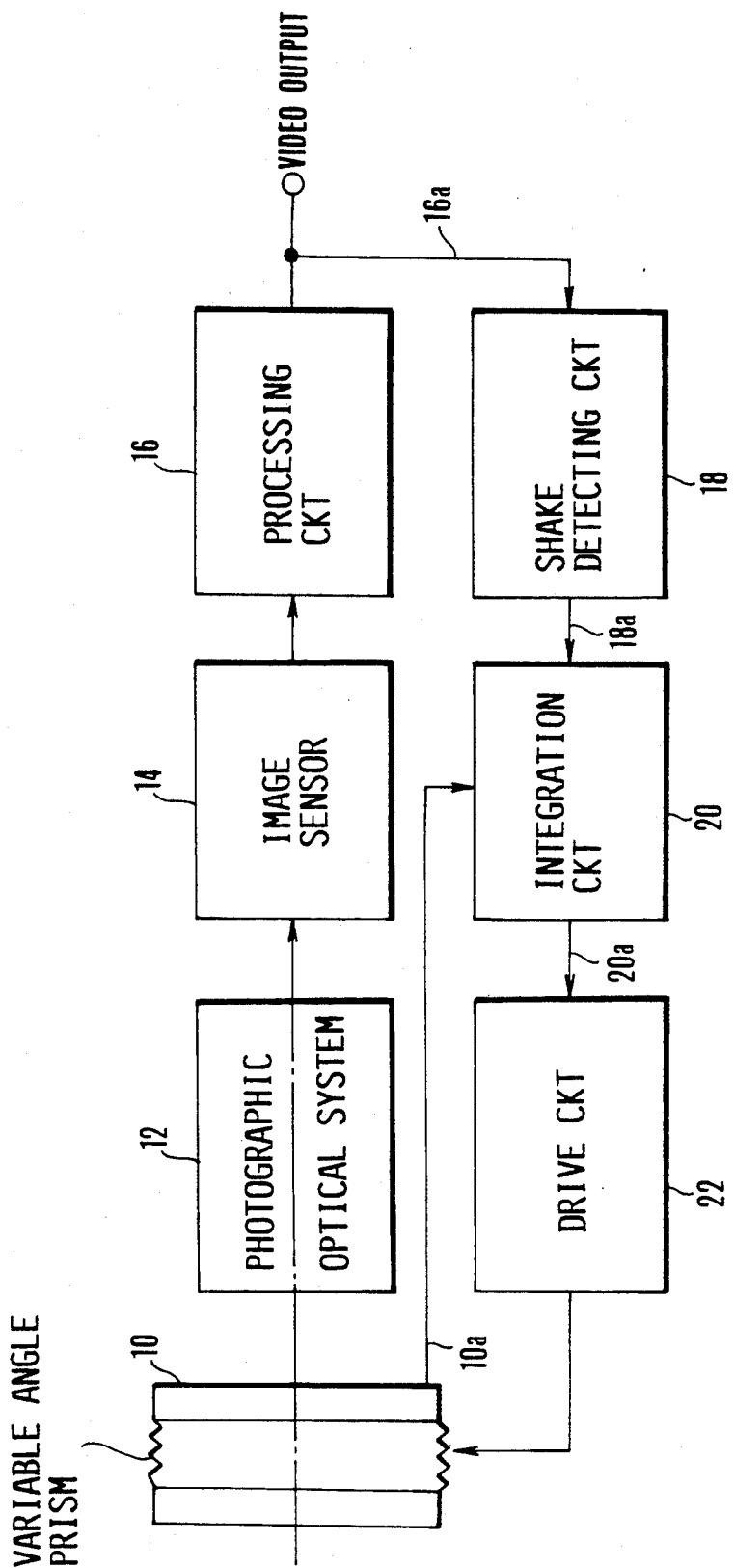
FIG. 1 is a block diagram illustrating an example of the optical system compensating apparatus taken as the basis of application of the invention.
Figure 4:
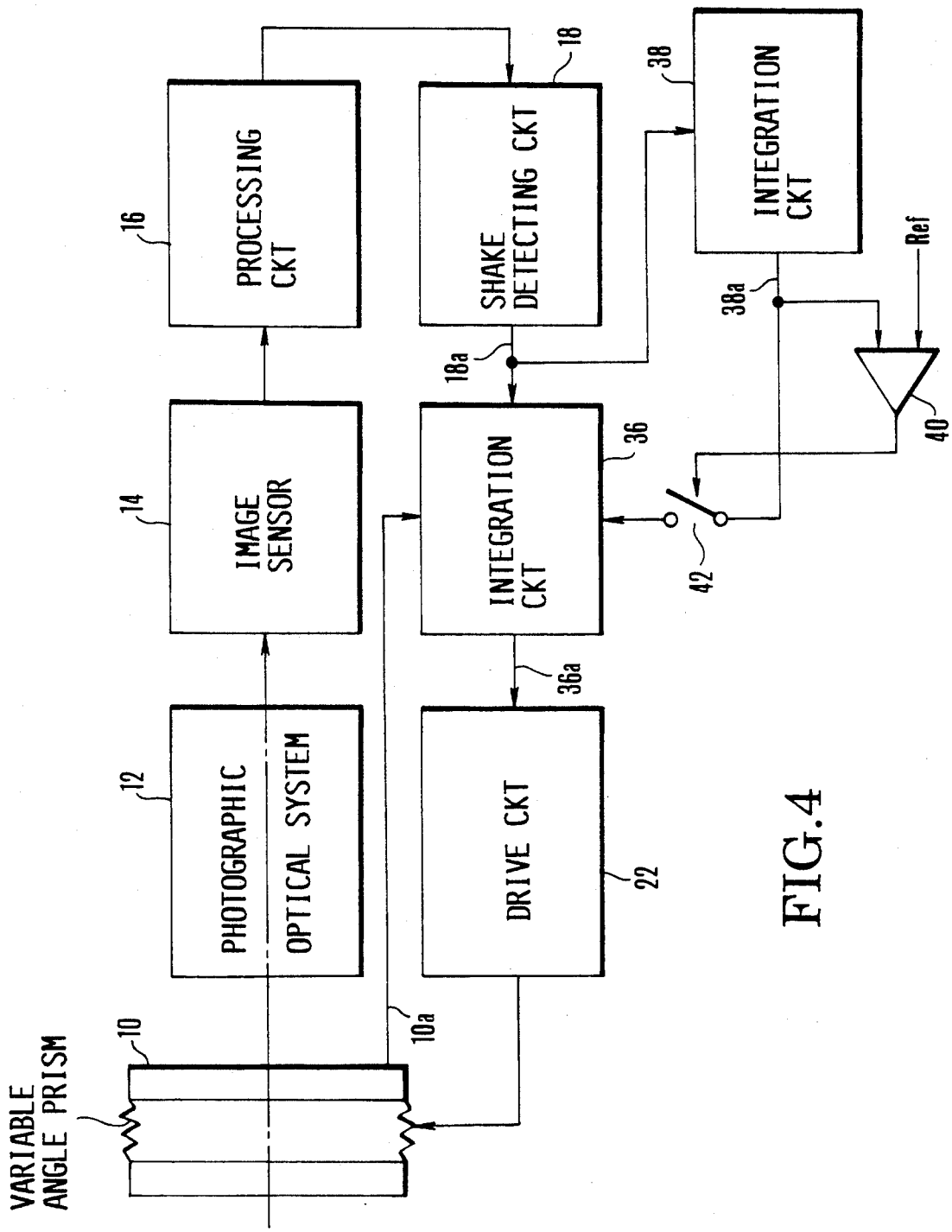
FIG. 4 is a block diagram illustrating an embodiment of an optical system compensating apparatus according to the invention.

FIG. 4 in block diagram shows one embodiment of the invention. The like constituent parts to those shown in FIG. 1 are denoted by the same reference numerals, and their explanation is omitted. A first integration circuit 36 is to obtain shake compensation information, and a second integration circuit 38 is to detect panning or tilting. The output of the integration circuit 38 is compared with a previously set constant reference value Ref by a comparison circuit 40. The comparison result of the comparison circuit 40 controls opening and closing of a switch 42. When closed, it supplies the output of the integration circuit 38 to the integration circuit 36.

The operation of FIG. 4 is described. The manner in which the variable angle prism 10 up to the shake detecting circuit 18 operate is the same as in the arrangement of FIG. 1, and is not described. From the shake detecting circuit 18, the shake detection information 18a concerning the amount of variation of the image and its direction of variation is output, being supplied to the integration circuit 36 and the integration circuit 38 to be integrated.

Figure 2:
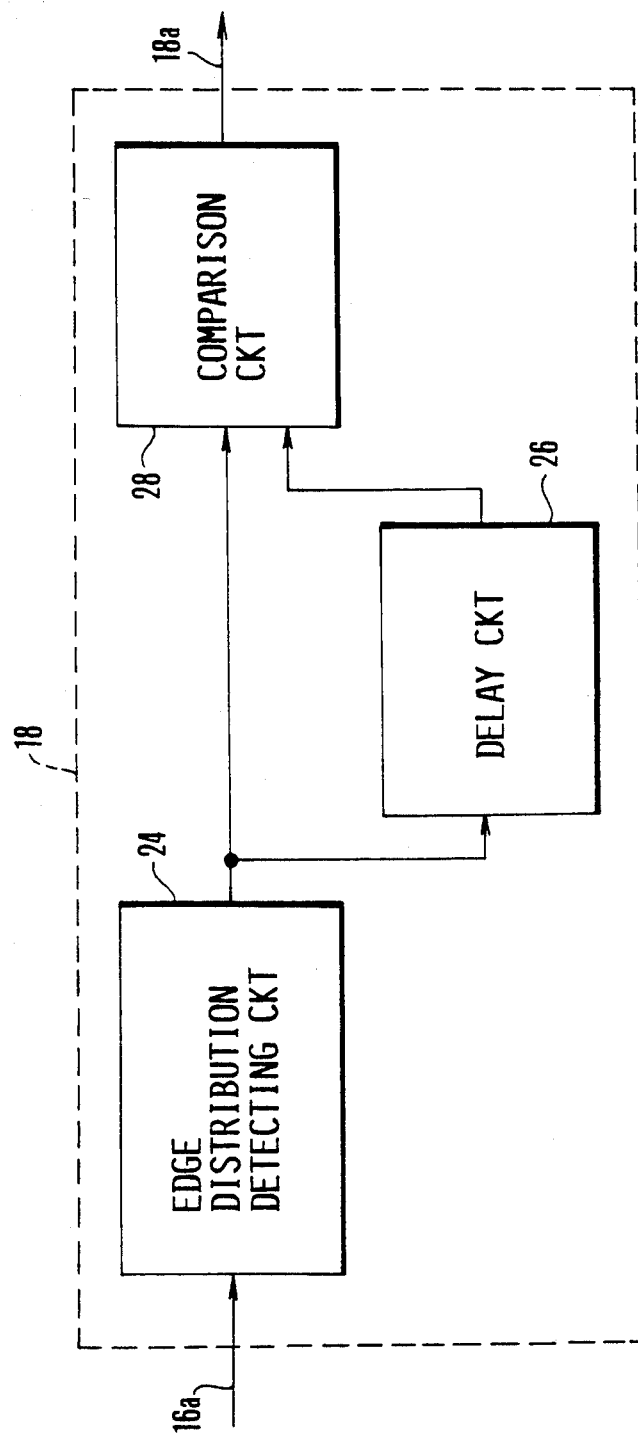
FIG. 2 is a block diagram illustrating the construction of the shake detecting circuit of FIG. 1.
Figure 3:
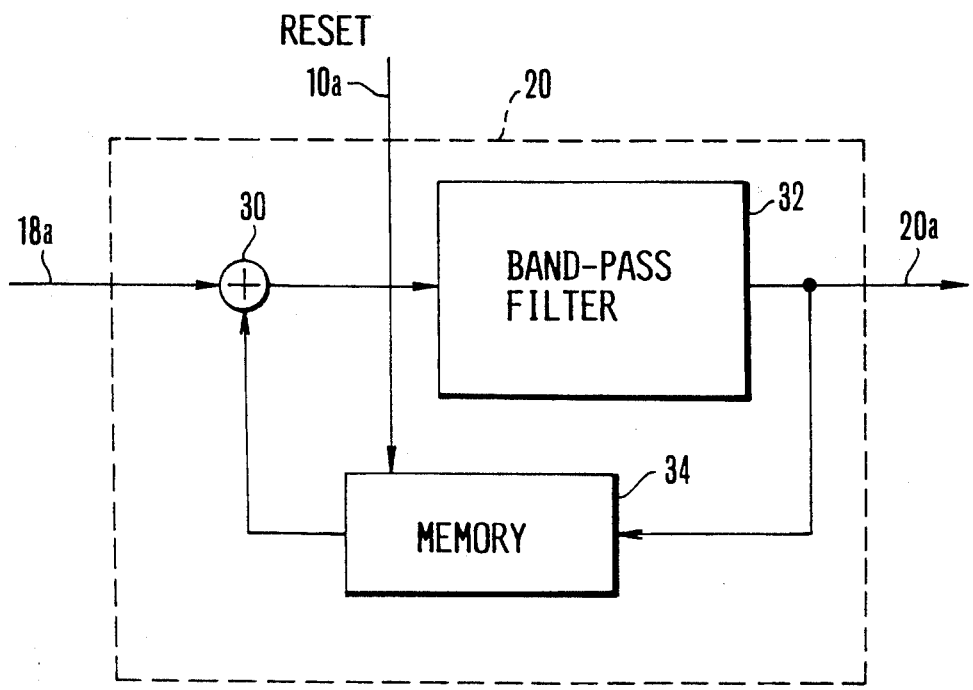
FIG. 3 is a block diagram illustrating the construction of the integration circuit of FIG. 1.
Figure 5:
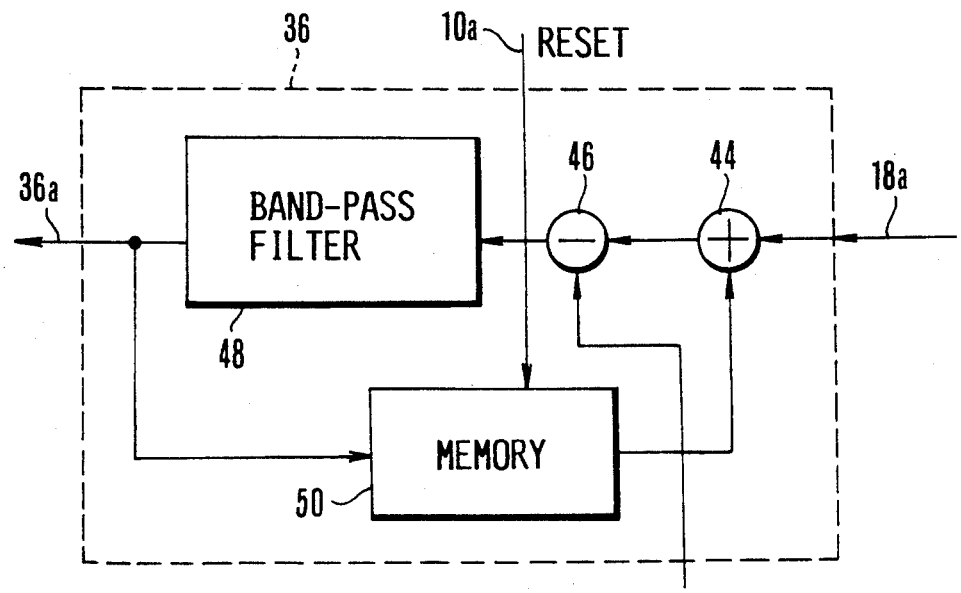
FIG. 5 is a block diagram illustrating the construction of the integration circuit 36 of FIG. 4.
Figure 6:
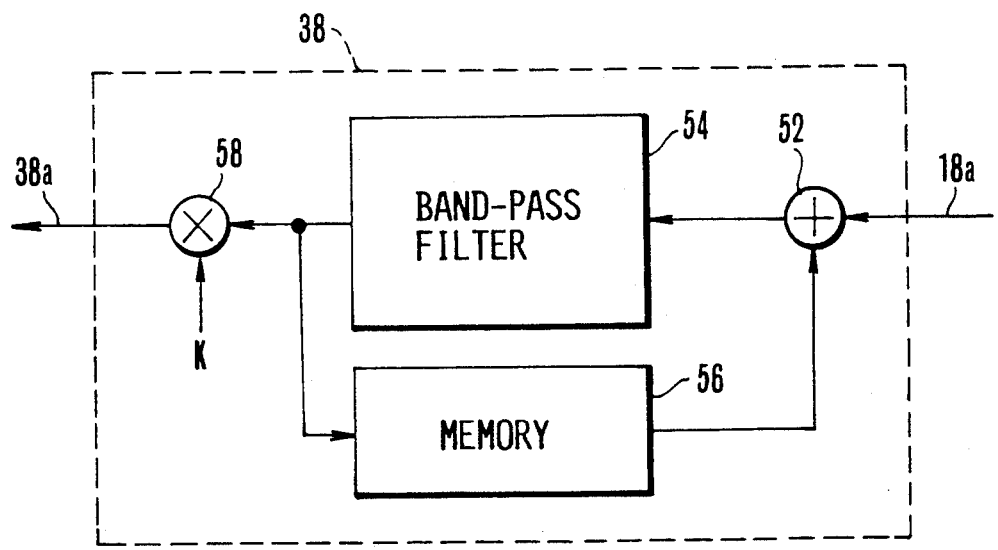
FIG. 6 is a block diagram illustrating the construction of the integration circuit 38 of FIG. 4.

FIG. 5 shows the details of the integration circuit 36 as comprising an adder 44 for adding the information stored in a memory 50 and the shake detection information 18a, a subtractor 46 for subtracting the information supplied from integration circuit 38 via the switch 42 from the output of the adder 44, a band-pass filter 48 for removing the information of the band which is not used as the shake information for performing shake compensation, and a memory 50 for memorizing the integration result. Also, FIG. 6 shows the details of the integration circuit 38 as comprising an adder 52, a band-pass filter 54, a memory 56 for memorizing the integration result, and a multiplier 58. The fundamental operation of the integration circuits 36 and 38 is the same as that of the integration circuit 20 of FIG. 1 to FIG. 3. It is to be noted that the pass characteristic of the band-pass filter 54 of the integration circuit 38 is indicated by the characteristic A of FIG. 7, while the band B of FIG. 7 corresponds to the band of the camera shake in hand-held shooting, that is, the pass characteristic of the band-pass filter 48 of the integration circuit 36. In more detail, the latter band is from about 0.5 to about 10 Hz. Therefore, the integration circuit 38 allows a lower band than the frequency band of the camera shake to pass therethrough. During the panning or tilting, the camera moves in one direction and its band is superimposed in part on the band in which the shake occurs. Therefore, the integrated value of the amount of shake indicates a monotonous increase or monotonous decrease as shown by the characteristic C or D in FIG. 8. The integrated value of the output of the band-pass filter 54 having the lower pass characteristic than the band of the shake, that is, the moving information due to the panning or tilting without inclusion of the shake information becomes as shown in the characteristic E or F of FIG. 8. That is, since the one-directional movement of the image is started at the same time when a panning or tilting occurs, the integrated value increases and, as the saturation is soon reached, arrives at a constant value. Hence, the detection of this level leads to a possibility of judging whether or not a panning or tilting has occurred.

The comparison circuit 40 compares the output of the integration circuit 38 with the previously set constant value Ref. When the constant value Ref is exceeded, it closes the switch 42. By the closure of the switch 42, the output 38a of the integration circuit 38 is supplied to the subtractor 46 of the integration circuit 36.

The multiplier 58 of the integration circuit 38 multiplies the output of the band-pass filter 54 by a constant K. By altering the constant K, the comparison in the comparison circuit 40 and the amount of feedback to the integration circuit 36 can freely be altered.

Figure 7:
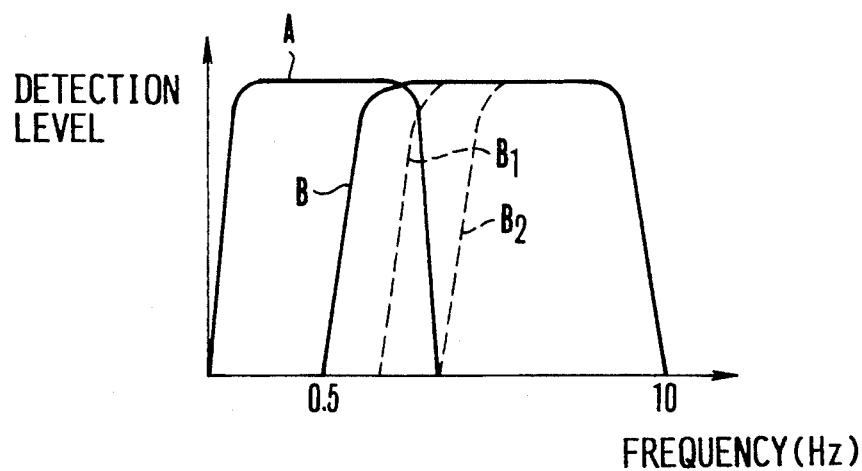
FIG. 7 is a graph of the pass band characteristic curves of the band pass filters 48 and 54 in FIG. 5 and FIG. 6.
Figure 8:
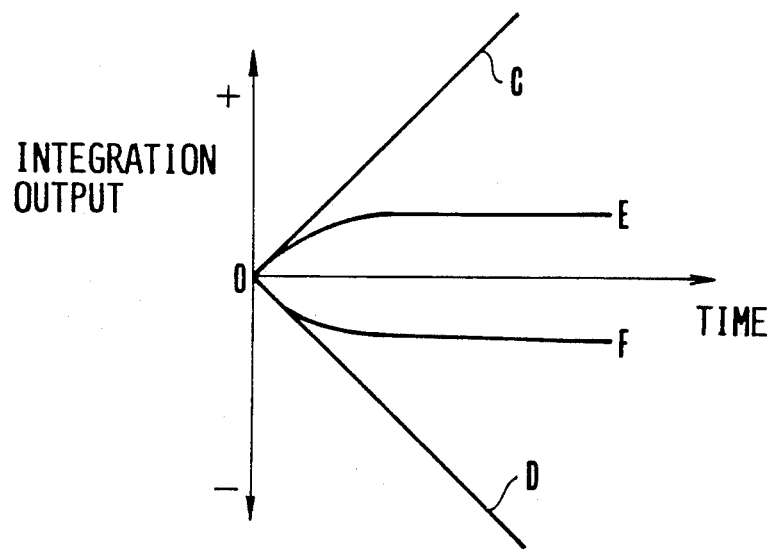
FIG. 8 is a graph of the integration characteristic curve of the integration circuit 36.

The band-pass filter 48 of the integration circuit 36 has the pass characteristic which is shown by the characteristic B in FIG. 7. Since this is similar to that of the integration circuit 20 of FIG. 1 to FIG. 3 in the frequency band of the camera shake due to the hand-held shooting, a similar signal to that in the conventional example representing the amount of compensation and the direction of compensation is produced. Yet, in the case of judgment of the occurrence of panning or tilting by the integration circuit 38 and the comparison circuit 40, the panning or tilting information 38a is subtracted from the output of the adder 44 by the subtractor 46. By this, the amount of shake compensation of the image is lessened, or the shake compensation is suppressed, when the panning or tilting is being detected. That is, in the prior art, if, as the image slowly changes in one direction, a panning or tilting is done, this operation would be judged as a shake, then the shake compensating operation follows to saturate the integration circuit, and then the compensating optical system would strike the stopper and bounce therefrom, and so on. In the present invention, such an unnatural compensation of the image can be prevented from occurring. Incidentally, if the constant K of the multiplier 58 is unity, the compensation of the panning or tilting direction does not take place.

Figure 9:
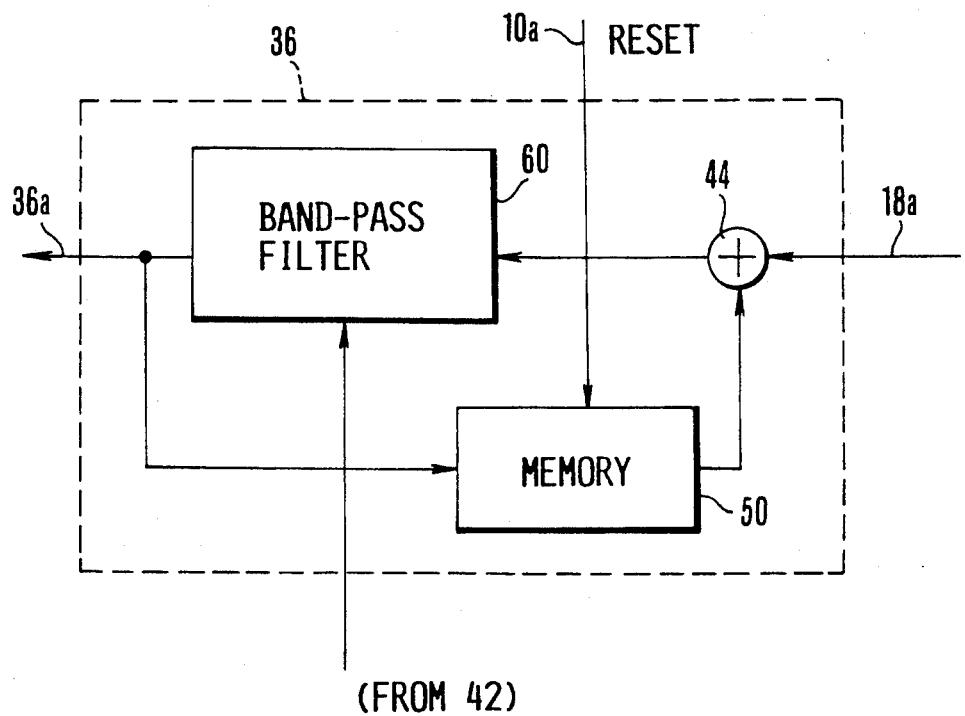
FIG. 9 is a block diagram illustrating another construction of the integration circuit 36.

Though, in the integration circuit 36 of FIG. 5, the panning or tilting information 38a is subtracted from the output (the amount of shake compensation) of the adder 44, it may be considered instead of this to use an arrangement that the characteristic of the band-pass filter changes. This arrangement is shown in a block diagram of FIG. 9. For example, depending on the output of the integration circuit 38, the low-band cutoff frequency of the band-pass filter 60 is moved to higher bands as shown by $B_1$ or $B_2$ of FIG. 7 so that the amount of compensation for the moving information due to the panning or tilting is lowered. That is, the shake detection information 18a, as described before, has the low frequency band component. So, by shifting the cutoff frequency of the band-pass filter 60 of the integration circuit 36 to the higher band side, it is made possible to do integration without inclusion of this shake detection information due to the panning or tilting.

In the above-described embodiments, the integration circuit 36 can get rid of saturation due to the panning or tilting. Therefore, the possibility of the variable angle prism 10 striking the stopper is reduced to zero. Further, in a case where the panning or tilting is done not at a constant speed but at randomly changing speeds, because this random unevenness appears as the shake detection output of high frequency component, the effect of shake compensation of the present embodiment appears so as to cancel this unevenness. Therefore, the panning or tilting becomes relatively smooth and appears at an almost constant speed.

As is understandable from the foregoing description, according to the present invention, a shake compensation, which is not affected by the panning or tilting, becomes possible to perform. Even when panning or tilting, a more comfortable photographed picture to view can be obtained.

What is claimed is:

1. An optical system compensating apparatus comprising:
   (A) image sensing means for converting an optical image formed by a photographic optical system into an electrical signal;
   (B) variation detecting means for detecting a temporal variation of each picture from an image signal output from said image sensing means;
   (C) drive means for driving said photographic optical system according to a detection result of said variation detecting means so as to decrease the temporal variation of each picture; and
   (D) discriminating means for discriminating a characteristic condition of temporal variation of each picture from the result of said variation detecting means and controlling said drive means according to the discriminating result of said discriminating means, said discriminating means being arranged to discriminate panning or tilting of said apparatus in the case where said characteristic condition shows that a degree of variation of the image is substantially a monotonous increase or a monotonous decrease from the detection result of said variation detecting means.

2. An apparatus according to claim 1, wherein said photographic optical system includes a compensating optical system capable of varying the direction of its optical axis.

3. An apparatus according to claim 2, wherein said compensating optical system is constructed with a variable angle prism capable of varying the direction of its optical axis, and wherein said drive means is able to change a vertex angle of said variable angle prism.

4. An apparatus according to claim 1, wherein said variation detecting means detects a variation of an image by comparing characteristic points of the image by every one field or every one frame.

5. An apparatus according to claim 4, wherein each said characteristic point is a detected position of an edge portion of the image or a position of gravity of a plurality of pieces of edge information.

6. An apparatus according to claim 1, wherein said drive means has integration means for integrating an output of said variation detecting means over a predetermined period.

7. An apparatus according to claim 6, wherein said integration means includes a filter for removing frequency components other than a frequency component corresponding to a shake component of the image, and a memory serving as an integration circuit for accumulating an output of said filter over said predetermined period, and wherein said photographic optical system is driven on the basis of a result obtained by extracting and integrating only the frequency component corresponding to the shake component of the image by said filter and said memory.

8. An apparatus according to claim 7, wherein said discriminating means, when the degree of variation of the image is the monotonous increase or the monotonous decrease, suppresses or stops an operation of said drive means of compensating for the variation of the image.

9. An apparatus according to claim 8, wherein said discriminating means includes an integration circuit having a filter for extracting frequency components lower than a frequency component of the image shake and a memory for accumulating an output of said filter over said predetermined period, and a comparison circuit for comparing an output of said integration circuit with a previously set threshold value.

10. An apparatus according to claim 9, wherein said discriminating means, when the output of said integration circuit is above said threshold value, decreases an integration value to be stored by said integration means of said drive means.

11. An apparatus according to claim 9, wherein said discriminating means, when the output of said integration circuit is above said threshold value, shifts a cutoff frequency of said filter of said drive means to a higher band side to decrease the amount of compensation for the amount of variation of the image due to a panning or tilting of a low frequency band component.

12. An image shake detecting apparatus comprising:
    (A) detecting means for detecting the amount of temporal variation of an image and the direction of the variation;
    (B) compensating means for compensating the variation of the image in a direction to cancel the variation of the image on the basis of a detection result of said detecting means;
    (C) discriminating means for discriminating a characteristic condition of variation of the image from an output of said detecting means to detect a panning or tilting; and
    (D) control means for controlling a compensating operation of said compensating means on the basis of a discriminating result of said discriminating means, wherein said discriminating means, when the degree of variation of the image is a monotonous increase or a monotonous decrease, discriminates that the detection result of said detecting means is a panning or tilting, and wherein said control means, when the panning or tilting is discriminated to be occurring, suppresses or stops an operation of said compensating means of compensating for the variation of the image.

13. An apparatus according to claim 12, wherein said compensating means is constructed with a variable angle prism capable of varying the direction of its optical axis.

14. An apparatus according to claim 13, wherein said detecting means detects variation of the image by comparing characteristic points of the image by every one field or every one frame.

15. An apparatus according to claim 14, wherein each said characteristic point is a detected position of an edge portion of the image or a position of gravity of a plurality of pieces of edge information.

16. An apparatus according to claim 12, wherein said compensating means includes an integration circuit for integrating the output of said detecting means over a predetermined period, said integration circuit including a filter for removing frequency components other than a frequency component corresponding to a shake component of the image and a memory for accumulating an output of said filter over said predetermined period, said optical system being compensated on the basis of a result obtained by extracting and integrating only the frequency component corresponding to the shake component of the image by said filter and said memory.

17. An apparatus according to claim 16, wherein said discriminating means includes an integration circuit having a filter for extracting a frequency component lower than the frequency component of the image shake and a memory for accumulating an output of said filter over said predetermined period, and a comparison circuit for comparing an output of said integration circuit with a previously set threshold value, and wherein when the output of said integration circuit is above said threshold value, a panning or tilting is discriminated to be occurring.

18. An apparatus according to claim 17, wherein said control means has switch means operating in such a manner that when a panning or tilting is discriminated to be occurring, an integration value accumulated by said integration circuit of said discriminating means is subtracted from an integration value of said integration circuit of said compensating means.

19. An apparatus according to claim 17, wherein said control means, when the output of said integration circuit of said judgment means is above said threshold value, shifts a cutoff frequency of said filter of said compensating means to a higher frequency side to decrease the amount of compensation for the amount of variation of the image due to a panning or tilting of a low frequency component.

20. An image shake compensating apparatus comprising:
(A) variation detecting means receptive of image information for detecting the amount of temporal variation of an image and the direction of the variation;
(B) compensating means for compensating for the variation of the image;
(C) drive means for driving said compensating means on the basis of a value obtained by integrating an output of said variation detecting means for a predetermined period so as to cancel the variation of the image; and
(D) control means for discriminating a condition of the temporal variation of the image from a detection result of said variation detecting means and controlling a driving characteristic of said driving means in accordance with that discrimination result, wherein said control means includes a filter for extracting a frequency component lower than the frequency component corresponding to the image shake, an integration circuit for integrating an output of said filter, and a comparison circuit for comparing an output of said integration circuit with a predetermined threshold value.

21. An apparatus according to claim 20, wherein said compensating means is a variable angle prism.

22. An apparatus according to claim 21, wherein said drive means includes a filter for extracting a frequency component corresponding to the shake of the image and an integration circuit for integrating an output of said filter.

23. An apparatus according to claim 22, wherein said control means detects, from the output of said integration circuit, a state in which the frequency component lower than the frequency component corresponding to the image shake monotonously increases or monotonously decreases, and detects the fact that said state has continued for a predetermined time by said comparison circuit so as to discriminate said fact to be caused by a panning or tilting.

24. An apparatus according to claim 23, wherein said control means, when the panning or tilting is discriminated to be occurring, decreases an integration value of said integration circuit of said drive means so as to decrease the amount of compensation of said compensating means driven by said drive means, or to interrupt the compensation.

25. An apparatus according to claim 22, wherein the frequency band corresponding to the image shake is about 0.5 to 1.0 Hz, and wherein said control means detects a panning or tilting from a frequency component lower than said frequency band.

26. A camera comprising:
(A) image scanning means for converting an optical image formed by a photographic optical system into an electrical signal;
(B) variation detecting means for detecting the amount of temporal variation of an image and the direction of the variation for each picture from an image signal output from said image sensing means;
(C) a compensating means for canceling the variation of the image;
(D) drive means for driving said compensating means on the basis of an average value of a detection result of said variation detecting means so as to decrease the temporal variation of the image; and
(E) control means for discriminating a condition of the temporal variation of the image from the detection result of said variation detecting means, and restricting, in the case where said condition shows that a degree of variation of the image is substantially a monotonous increase or a monotonous decrease from the detection result of said variation detection means, a compensating operation of said compensating optical system by said drive means.

27. A camera according to claim 26, wherein said compensating optical system is a variable angle prism.

28. A camera according to claim 26, wherein said control means, when a state in which the amount of variation of the image monotonously increases or decreases in one direction continues for a predetermined period, judges said state to be caused by a panning or tilting.

* * * * *